(12) United States Patent
Ramirez (10) Patent No.: US 7,921,364 B2
(45) Date of Patent: Apr. 5, 2011

(54) CONTROLLING A COMPUTER USER INTERFACE WITH SOUND

(75) Inventor: Nelson Ramirez, Rochester, MN (US)

(73) Assignee: Nuance Communications, Inc., Burlington, MA (US)

( * ) Notice: Subject to any disclaimer, the term of this patent is extended or adjusted under 35 U.S.C. 154(b) by 550 days.

(21) Appl. No.: 11/266,738

(22) Filed: Nov. 3, 2005

(65) Prior Publication Data

US 2007/0100633 A1     May 3, 2007

(51) Int. Cl.
  *G06F 3/16*     (2006.01)
  *G06G 3/048*    (2006.01)
(52) U.S. Cl. .................. 715/728; 715/856; 345/157
(58) Field of Classification Search .................. 715/728, 715/858, 865, 856; 345/157, 158; 704/205
  See application file for complete search history.

(56) References Cited

U.S. PATENT DOCUMENTS

| | | | | |
|---|---|---|---|---|
| 4,063,035 A * | 12/1977 | Appelman et al. | ............ | 704/213 |
| 5,133,011 A * | 7/1992 | McKiel, Jr. | .................. | 704/276 |
| 5,818,423 A * | 10/1998 | Pugliese et al. | ................ | 345/157 |
| 5,920,841 A | 7/1999 | Schottmuller et al. | | |
| 6,037,930 A * | 3/2000 | Wolfe et al. | .................... | 345/174 |
| 6,208,359 B1 | 3/2001 | Yamamoto | | |
| 6,297,818 B1 | 10/2001 | Ulrich et al. | | |
| 6,424,357 B1 * | 7/2002 | Frulla et al. | .................... | 715/728 |
| 6,519,566 B1 * | 2/2003 | Boyer et al. | .................. | 704/275 |
| 7,307,615 B2 * | 12/2007 | Gehlot et al. | ................. | 345/156 |
| 7,523,038 B2 | 4/2009 | Ariav | | |
| 2003/0018477 A1 | 1/2003 | Hinde | | |
| 2004/0010414 A1 * | 1/2004 | Tahara et al. | ................. | 704/275 |
| 2004/0138892 A1 * | 7/2004 | Iwamoto et al. | ............. | 704/275 |
| 2008/0215335 A1 | 9/2008 | Tahara et al. | | |

FOREIGN PATENT DOCUMENTS

| | | |
|---|---|---|
| CN | 1641563 A | 7/2005 |
| JP | 62-157938 | 7/1987 |
| JP | 06-342365 | 12/1994 |
| JP | 10-326175 | 12/1998 |
| JP | 2001-147761 | 5/2001 |

OTHER PUBLICATIONS

Olwal, Alex et al., "Using Prosodic Features of Speech and Audio Localization in Graphical User Interfaces", Jun. 2003, pp. 1-4, New York.

Lee, Zune "Painting Noise Sound", 2003, pp. 2-8, Stanford University.

(Continued)

*Primary Examiner* — Kieu Vu
*Assistant Examiner* — Blaine T. Basom
(74) *Attorney, Agent, or Firm* — Wolf, Greenfield & Sacks, P.C.

(57) ABSTRACT

Controlling a computer user interface with sound including defining ranges of audio frequencies; associating each range with a user interface command; receiving as input from a user a sound representing an instruction to execute a user interface command, the sound characterized by a spectrum of frequencies and energies; identifying the user interface command to be executed in dependence upon the spectrum of frequencies and energies, the defined ranges of audio frequencies, and the user interface commands associated with the ranges; and executing the identified command.

27 Claims, 9 Drawing Sheets

OTHER PUBLICATIONS

Allen and Harper, "2pSC6. Interactive prosody training workstation," ASA 131st Meeting, Indianapolis, IN, May 1996, http://www.auditory.org/asamtgs/asa96ind/2pSC/2pSC6.html, downloaded Mar. 20, 2007.

Office Action from Chinese Patent Application No. 200610143747.8 dated Apr. 21, 2010.

Duan, Shengquan, "Application of Frequency-Division Matching in Speech Recognition and Control," *Acoustics and Electronics Engineering*, 79:24-27 (Mar. 2005).

* cited by examiner

| Power Spectrum Table 364 ||
|---|---|
| Frequency (Hertz) | Energy (Joules) |
| 440 | 0.90 |
| 880 | 0.60 |
| 1760 | 0.35 |
| 2640 | 0.25 |
| 3520 | 0.10 |

CONTROLLING A COMPUTER USER INTERFACE WITH SOUND

BACKGROUND OF THE INVENTION

1. Field of the Invention

The field of the invention is data processing, or, more specifically, methods, apparatus, and products for controlling a computer user interface with sound.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas of computer technology that has expanded in recent years in input/output or I/O. In the 1970s, the principal I/O devices were punch cards, paper tape, and teletype terminals; remote terminals with display screens were rare, and their displays were primarily text, rarely graphics. Today graphical user interfaces ('GUIs') are common, with available manipulation by mouse, roller balls, touch-sensitive screens, text-to-speech converters, and so on. Most computer I/O technology, however, especially on the input side, continues to require some manipulation of an interface by hand. So much so, in fact, that it is common to find it a burden to move one's hand from a keyboard to a mouse and back, again, and again, and again. There is, therefore, an ongoing need for improvement in control of computer user interfaces.

SUMMARY OF THE INVENTION

Methods, apparatus, and computer program products are disclosed that support improved, hands-free operation of a computer user interface. More particularly, methods, apparatus, and computer program products are disclosed for controlling a computer user interface with sound that include defining ranges of audio frequencies; associating each range with a user interface command; receiving as input from a user a sound representing an instruction to execute a user interface command, the sound characterized by a spectrum of frequencies and energies; identifying the user interface command to be executed in dependence upon the spectrum of frequencies and energies, the defined ranges of audio frequencies, and the user interface commands associated with the ranges; and executing the identified command.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
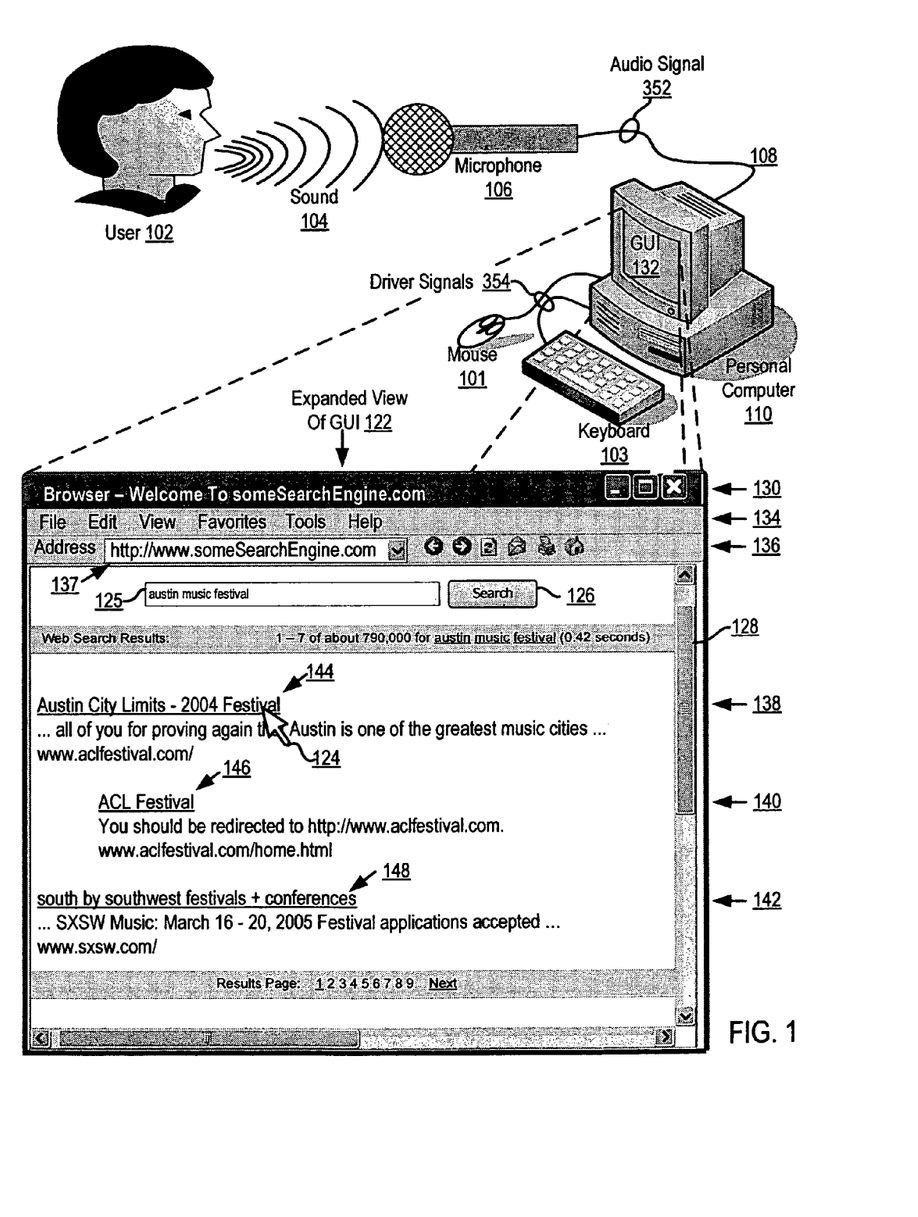
FIG. 1 sets forth a system diagram illustrating an exemplary system for controlling a computer user interface with sound according to embodiments of the present invention.

Exemplary methods, apparatus, and products for controlling a computer user interface with sound according to embodiments of the present invention are described with reference to the accompanying drawings, beginning with FIG. 1. FIG. 1 sets forth a system diagram illustrating an exemplary system for controlling a computer user interface with sound according to embodiments of the present invention. The system of FIG. 1 includes a microphone (106) that is connected to computer (110) by microphone cable (108). The system of FIG. 1 also includes a computer mouse (101), a keyboard (103), and a display screen that displays a graphical user interface or 'GUI' (132). In this example, microphone (106), mouse (101), keyboard (103), display screen with GUI (132) together comprise a computer user interface controllable with sound according to embodiments of the present invention.

The system of FIG. 1 includes a personal computer (110) that is improved for control of its user interface with sound according to embodiments of the present invention. More particularly, computer (110) is improved with additional computer program instructions or computer hardware generally to implement control of its computer user interface with sound according to embodiments of the present invention by defining ranges of audio frequencies, associating each range with a user interface command and receiving as input from a user (102) a sound (104) representing an instruction to execute a user interface command where the sound is characterized by a spectrum of frequencies and energies. Computer (110) is programmed to identify the user interface command to be executed in dependence upon the spectrum of frequencies and energies, the defined ranges of audio frequencies, and the user interface commands associated with the ranges. And then computer (110) executes the identified command.

The user interface commands so identified and executed may be any commands that a user may instruct a computer to carry out by use of any aspect of a user interface of a computer. Such commands may include, for example, commands associated with pushing a mouse button, releasing a mouse button, both pushing and releasing ('click') a mouse button, moving a mouse, dragging a mouse, and rotating a mouse scroll wheel. Such commands may include, for example, commands traditionally issued by keypresses of a keyboard, text entry, function keys, motion keys, Page-Up, Page-Down, Home, End, Up-Arrow, Down-Arrow, numeric keypad keystrokes, and so on. Such commands may include, for example, commands normally issued by multiple keys simultaneously ('chords') such as control-s, control-p, control-f, control-a, and control-z.

FIG. 1 also depicts an expanded view (122) of the GUI. In the example of FIG. 1, the user interface, including the GUI, provides an interface for, among other things, an exemplary software application program, more particularly, in the example of FIG. 1, a browser.

The browser of FIG. 1, as depicted, has been operated to point to a web site named "someSearchEngine.com," as shown in the title bar (130) of the browser display. The browser of FIG. 1 also includes a horizontal menu (134) containing menu items named: File, Edit, View, Favorites (called 'Bookmarks' on some browsers), Tools, and Help. The browser of FIG. 1 includes a GUI toolbar (136) with a Back button, a Forward button, and buttons for refreshing the display, emailing a link to the display, printing the display, and returning to a home page configured in the browser. The exemplary browser of FIG. 1 also includes an address bar (137) for use in browser navigation.

The browser of FIG. 1 has been operated, by use of text entry field (125) and search button (126), to submit the query 'austin music festival' to someSearchEngine.com. Several search results (138, 140, 142) are displayed on the browser screen. Each search result includes an anchor, some sample text from the web site linked to the search result, and a URL that links the search result to a web page. An 'anchor' is a highlighted (here underlined) portion of each search result (144, 146, 148) that represents a link to another web page as identified by a URL in each search result. In search result (138), for example, the anchor is "Austin City Limits—2004 Festival," the sample text is " . . . all of you for proving again that Austin is one of the greatest music cities . . . ," and the URL is "www.aclfestival.com/."

GUI (122) also includes a pointer (124) that is moveable on the display by manipulation of a physical pointer tool such as a roller ball, a mouse, or a pressure sensitive plate or screen. In this example, mouse (101) drives pointer (124). In this example, therefore, pointer (124) is referred to sometimes as a 'mouse pointer,' and a move of pointer (124) may be referred to as a 'mouse move.'

Browser GUI (122) as so illustrated may be operated to effect the following exemplary user interface commands:

A mouse move over and a mouse click upon an entry in menu (134) represents a user interface command to invoke a menu item, File, Edit, View, and so on.

A mouse move over and a mouse click upon a button of toolbar (136) represents a user interface command to invoke the browser function represented by the button, Back, Forward, Refresh, and so on.

Typing text into text entry field (125) followed by a mouse move over and mouse click upon Search button (126) represents a user interface command to submit a query to someSearchEngine.com.

A mouse move over and a mouse click upon an anchor (144, 146, 148) of a search result (138, 140, 142) represents a user interface command to the browser to retrieve and display the web page linked through the anchor.

A mouse drag of vertical slider bar (128) represents a user interface command to scroll the GUI and display more search results.

In addition, the user interface of computer (110) as illustrated and described here also may be capable of control by sound according to embodiments of the present invention so that the user interface commands described above, and others as will occur to those of skill in the art, may be effected by associating a range of audio frequencies with a user interface command, receiving as input from a user (102) a sound (104) representing an instruction to execute a user interface command where the sound is characterized by a spectrum of frequencies and energies, identifying the user interface command in dependence upon the spectrum of frequencies and energies, the defined ranges of audio frequencies, and the user interface commands associated with the ranges, and executing the identified command. That is, a user may effect user interface commands of the kind described above on computer (110) by whistling, humming, singing, or playing a clarinet.

Controlling a computer user interface with sound according to embodiments of the present invention is generally implemented with computers, that is, with automated computing machinery. For further explanation, therefore, FIG. 2 sets forth a block diagram of automated computing machinery comprising an exemplary computer (152) useful in controlling a computer user interface with sound according to embodiments of the present invention. The computer (152) of FIG. 2 includes at least one computer processor (156) or 'CPU' as well as random access memory (168) ('RAM') which is connected through a system bus (160) to processor (156) and to other components of the computer.

Figure 2:
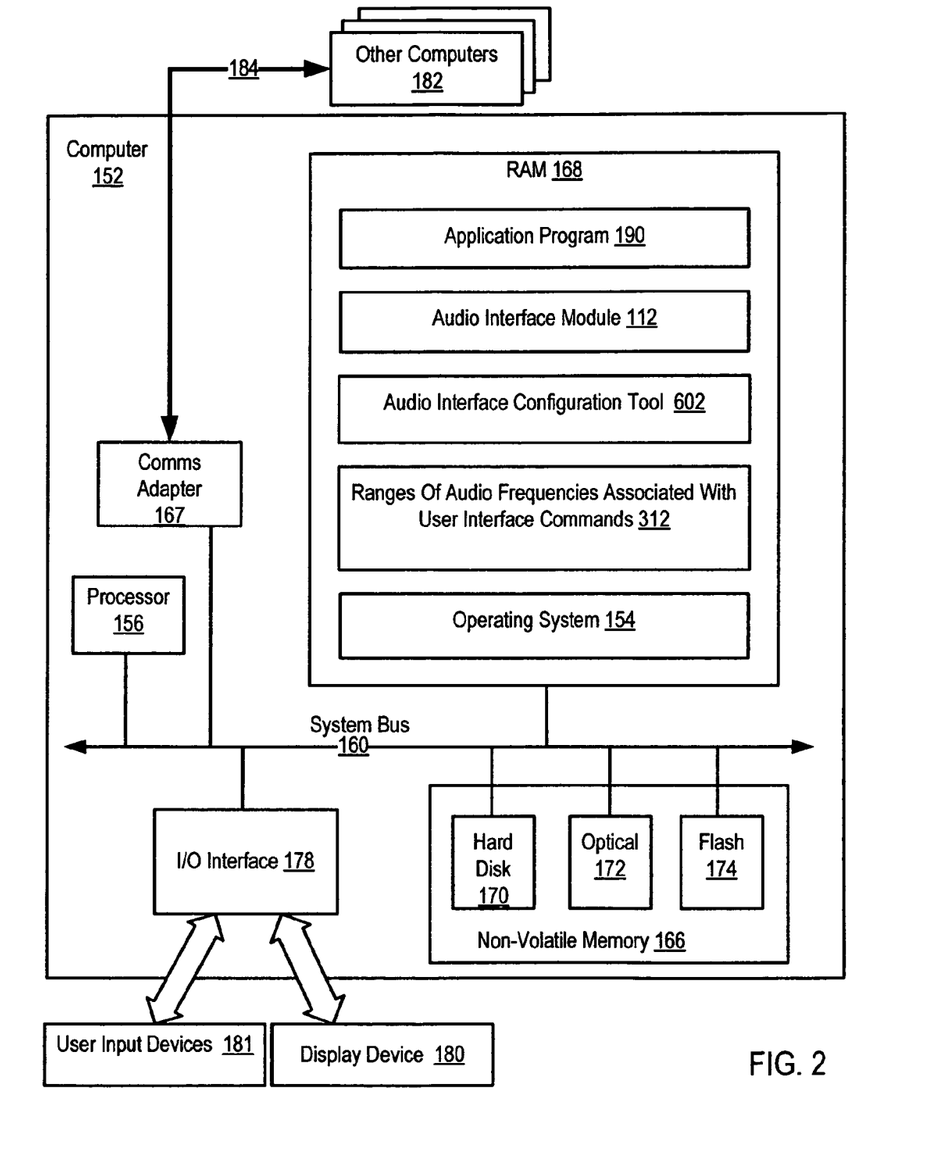
FIG. 2 sets forth a block diagram of automated computing machinery comprising an exemplary computer useful in controlling a computer user interface with sound according to embodiments of the present invention.

Stored in RAM (168) is a audio interface module (112), computer program instructions for controlling a computer user interface with sound according to embodiments of the present invention by receiving as input from a user a sound representing an instruction to execute a user interface command, identifying the user interface command to be executed in dependence upon a spectrum of frequencies and energies, defined ranges of audio frequencies, and user interface commands associated with the ranges, and executing the identified command. Also stored in RAM is an audio interface configuration tool (602), a module of computer program instructions that implements a GUI tool for defining ranges of audio frequencies and associating each range with a user interface command. Also stored in RAM is data (312) representing ranges of audio frequencies associated with user interface commands.

Also stored in RAM (168) is an application program (190), computer program instructions for user-level data processing. Application program (190) is capable of operating a user interface by generating user interface events for display, for example on a video screen through a GUI, and by receiving notification of user interface events from operating system (154).

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154), application program (190), audio interface module (112), audio interface configuration toll (602), and data (312) representing ranges of audio frequencies associated with user interface commands in the example of FIG. 2 are shown in RAM (168), but many components of such software and computer data may be stored in non-volatile memory (166) also.

Computer (152) of FIG. 2 includes non-volatile computer memory (166) coupled through a system bus (160) to processor (156) and to other components of computer (152). Non-volatile computer memory (166) may be implemented as a hard disk drive (170), optical disk drive (172), electrically erasable programmable read-only memory space (so-called 'EEPROM' or 'Flash' memory) (174), or as any other kinds of non-volatile computer memory as will occur to those of skill in the art.

The example computer (152) of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards, mice, and microphones.

The exemplary computer (152) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 3:
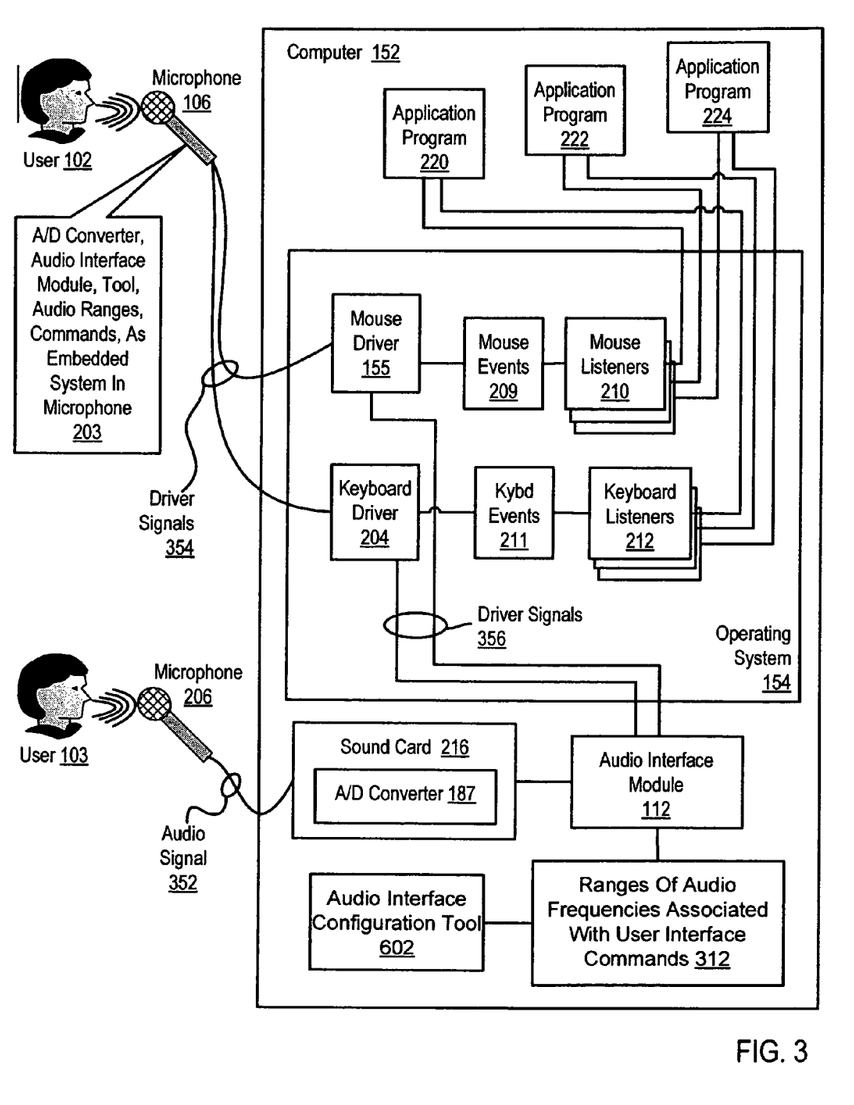
FIG. 3 sets forth a block diagram of a further computer system for controlling a computer user interface with sound according to embodiments of the present invention.

For further explanation, FIG. 3 sets forth a block diagram of a further computer system (152) for controlling a computer user interface with sound according to embodiments of the present invention. In the example of FIG. 3, application programs (220, 222, 224) are registered with operating system (154) as mouse listener (210) and keyboard listeners (212). Mouse events (209) and keyboard events (211) detected by operating system (154) are provided to application programs (220, 222, 224) through mouse driver (155) and keyboard driver (204). The system of FIG. 3, however, contains no mouse and no keyboard. Driver signals (354, 356) that would traditionally be output from a mouse or a keyboard are provided instead by an audio interface module programmed to control a computer user interface with sound according to embodiments of the present invention.

The system of FIG. 3 illustrates alternative architectural aspects of systems for controlling a computer user interface with sound according to embodiments of the present invention. In one architectural aspect, microphone (206) converts sound from user (103) into an electrical analog audio signal (352). The audio signal is provided to audio interface module (112) through sound card (216) which converts the signal from analog to digital form by analog-to-digital converter (187), so that the audio signal as provided to audio interface module (112) is in digital form. Audio interface module (112) further processes the audio signal, transforming the signal from the time domain to the frequency domain, selecting a frequency component of the signal having the largest energy, identifying from the ranges of audio frequencies associated with user interface commands (312) a range containing the frequency component having largest energy, thereby identifying the user interface command represented by the sound from the user, and executing the command by providing to a driver (155, 204) a driver signal (356) representing that command. From the point of view of the drivers (155, 204), the driver signal received by a driver is the same signal that would have been received from an actual mouse or keyboard.

In another architectural aspect of controlling a computer user interface with sound according to embodiments of the present invention, in the system of FIG. 3, microphone (106) is configured with an embedded system whose output is driver signals (354) provided directly to drivers (155, 204) who view the driver signals just as though they were received from an actual mouse or keyboard. An embedded system is a special-purpose computer system, which is completely encapsulated by the device it controls. Unlike a general-purpose personal computer, an embedded system has specific requirements and performs pre-defined tasks. An embedded system is a programmed hardware device. A programmable hardware chip is the raw material of an embedded system, and the embedded system is programmed with a particular application. This is to be understood in comparison to more general purpose computer systems with general purpose hardware and externally loaded software. Embedded systems are a combination of hardware and software which facilitates mass production and variety of applications.

In the second architectural aspect of the system of FIG. 3, microphone (106) is configured with an embedded system that includes an analog-to-digital converter, an audio interface module, ranges of audio frequencies associated with user interface commands, and an audio interface configuration tool. The embedded system (203), by microphone (106), converts sound from user (102) into an electrical analog audio signal, converts the signal to digital form, transforms the signal from the time domain to the frequency domain, selects a frequency component of the signal having the largest energy, identifies from ranges of audio frequencies associated with user interface commands a range containing the frequency component having largest energy, identifies thereby the user interface command represented by the sound from the user, and executes the command by providing to a driver (155, 204) a driver signal (354) representing that command. Again, from the point of view of the drivers (155, 204), the driver signal received by a driver is the same signal that would have been received from an actual mouse or keyboard.

The architectural aspects of the system of FIG. 3 are provided as explanatory examples, not as limitations of the present invention. Other system architectures for controlling a user interface with sound will occur to those of skill in the art, and all such architectures are well within the scope of the present invention.

Figure 4:
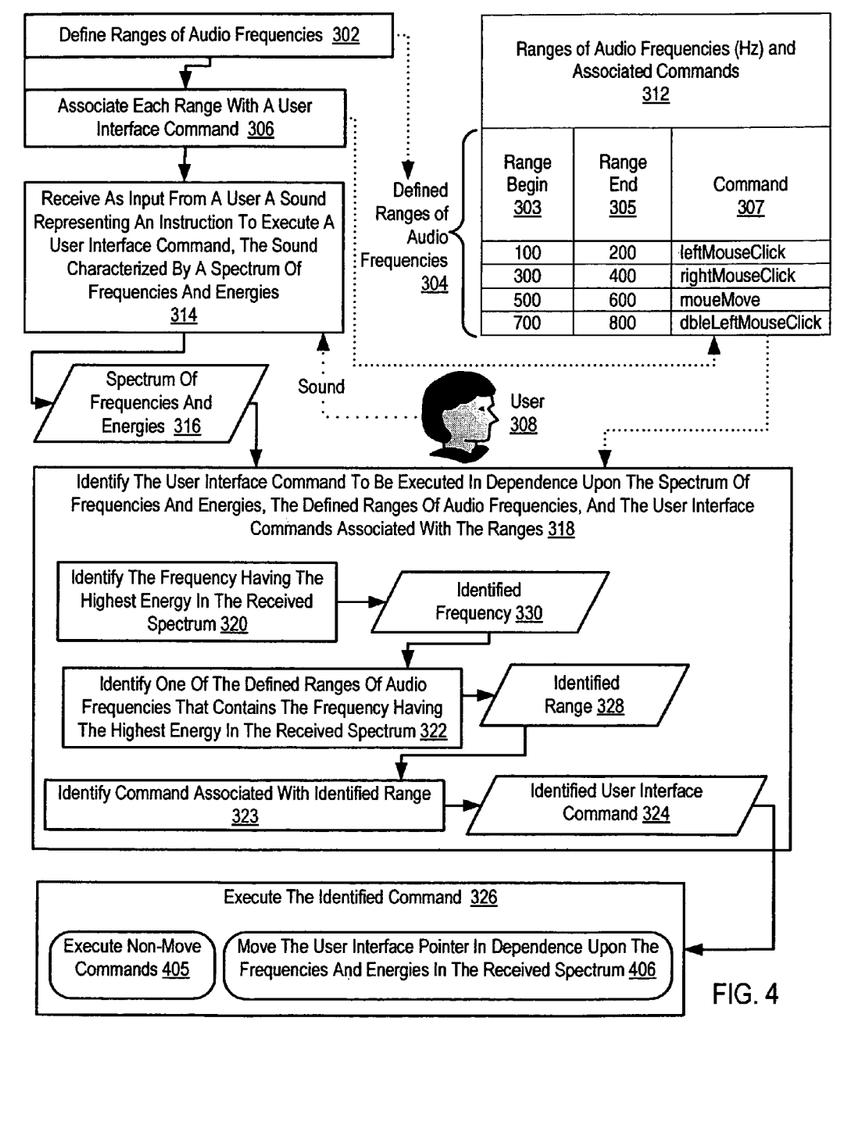
FIG. 4 sets forth a flow chart illustrating an exemplary method for controlling a computer user interface with sound according to embodiments of the present invention.

For further explanation, FIG. 4 sets forth a flow chart illustrating an exemplary method for controlling a computer user interface with sound according to embodiments of the present invention that includes defining (302) ranges (304) of audio frequencies and associating (306) each range of audio frequencies with a user interface command. Defined ranges (304) of audio frequencies may be associated with user interface commands in a data structure such as, for example, table (312) in FIG. 4. Table (312) defines ranges of audio frequencies by a column (303) for the beginning of a range with values expressed in Hertz and a column (305) for the end of a range with values expressed in Hertz. Table (312) associates defined ranges of audio frequencies with user interface commands by a column (307) for user interface commands whose values are text identifiers of user interface commands, leftMouseClick, rightMouseClick, mouseMove, and so on. Each record of table (312) associates a range of audio frequencies with a user interface command.

User interface commands useful in the example of FIG. 4 and in various embodiments of the present invention include mouse commands such as push a button, release a button, both push and release ('click') a button, move the mouse, drag the mouse, and rotate the mouse scroll wheel. User interface commands also include keyboard commands. Commands using a single key include pressing character keys; pressing movement keys such as up-arrow, down-arrow, left-arrow, right-arrow, page-up, page-down, and home; and pressing function keys. Commands using multiple keys simultaneously ('chords') include pressing control-s, control-p, control-f, control-a, and control-z. Other user interface commands useful in controlling a computer user interface with sound will occur to those of skill in the art, and the use of all such commands in methods and systems for controlling a computer user interface with sound is well within the scope of the present invention.

Figure 5:
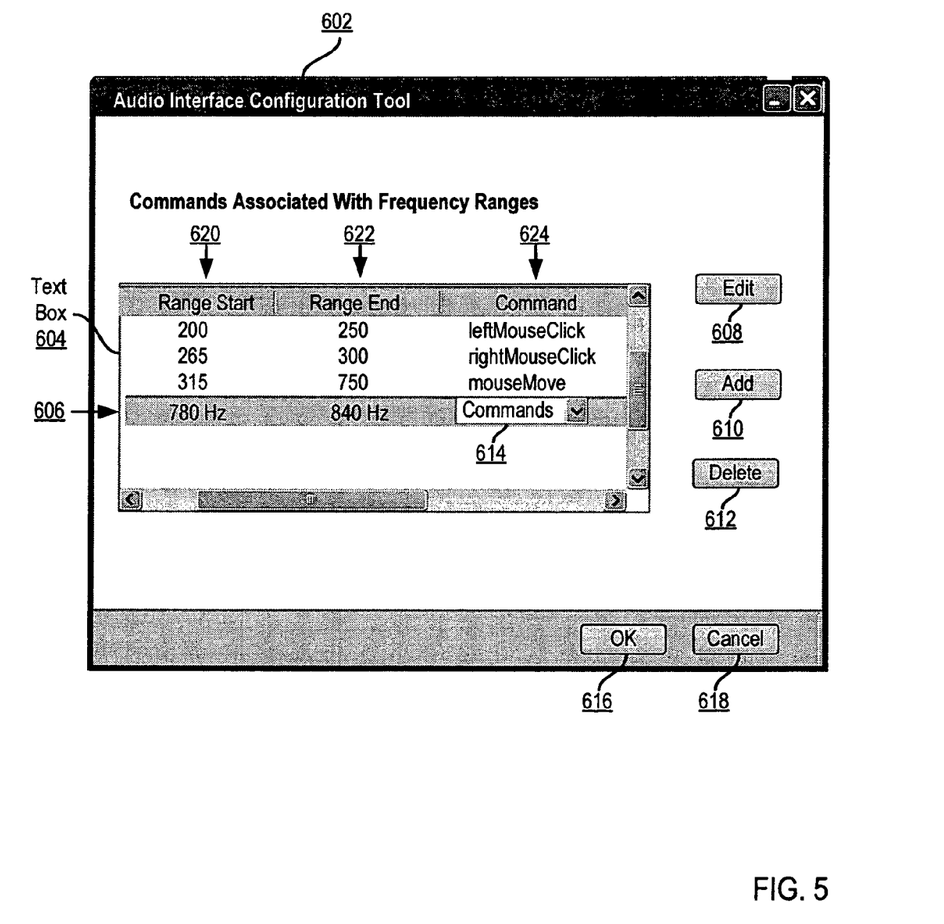
FIG. 5 sets forth a line drawing of a GUI display of an exemplary audio interface configuration tool that supports definition of ranges of audio frequencies and associating user interface commands with the ranges according to embodiments of the present invention.

Defining (302) ranges (304) of audio frequencies and associating (306) each range of audio frequencies with a user interface command are further explained with reference to FIG. 5. FIG. 5 sets forth a line drawing of a GUI display of an exemplary audio interface configuration tool (602) that supports definition of ranges of audio frequencies and associating user interface commands with the ranges according to embodiments of the present invention. The audio interface configuration tool (602) displays a text box (604) depicting data that associates ranges of audio frequencies with user interface commands, column (620) for the beginning of each range in Hertz, column (622) for the end of each range in Hertz, and column (624) for an identifier for each associated user interface command. The data displayed in text box (604) may be derived from or displayed from a table such as the one illustrated at reference (312) on FIG. 4, for example.

Text box (604) includes a row (606) under edit by a user. A user has either selected a previously-existing row of data to edit and then operated the audio interface configuration tool by mouse-clicking its Edit button (608), or the user has created a new row of data by mouse-clicking the tool's Add button (610). The user then has entered the values of 780 Hertz as the beginning of a range of audio frequencies and 840 Hertz as the end of the range. These values represent a frequency range extending from 780 Hertz to 840 Hertz. The third column of row (606) under edit displays a combo box (614). When a user activates the combo box (614) by clicking on the down arrow on the right of the combo box, the combo box presents a list of user interface commands. A user may select a command from the list by clicking on the command, thereby completing data entry for the row under edit, thereby associating the selected user interface command with the defined range of audio frequencies.

Figure 6A:
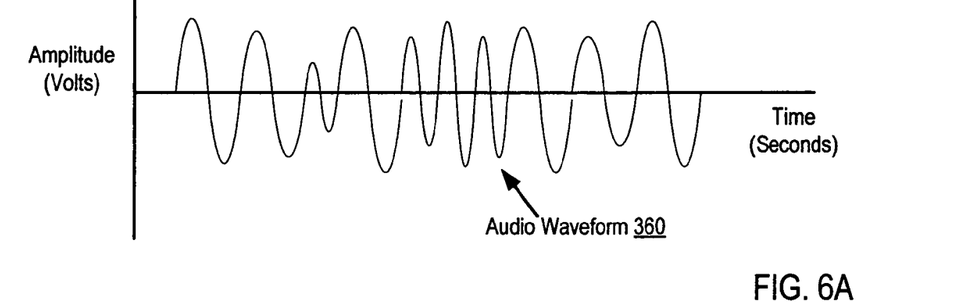
FIG. 6A depicts an audio waveform of an electronic audio analog signal resulting from conversions of an audio signal from sound by a microphone to an electrical signal having frequency components in the audio frequency range between approximately 20 Hertz and 20,000 Hertz.

Again with reference to FIG. 4: The method of FIG. 4 includes receiving (314) as input from a user (308) a sound representing an instruction to execute a user interface command, the sound characterized by a spectrum (316) of frequencies and energies. A sound characterized by a spectrum of frequencies and energies is further explained with reference to FIGS. 6A, 6B, and 6C. FIG. 6A depicts an audio waveform (360) of an electronic audio analog signal resulting from conversions of an audio signal from sound by a microphone to an electrical signal having frequency components in the audio frequency range between approximately 20 Hertz and 20,000 Hertz. FIG. 6A represents the audio waveform by its amplitude in Volts as a function of time measured in seconds.

Figure 6B:
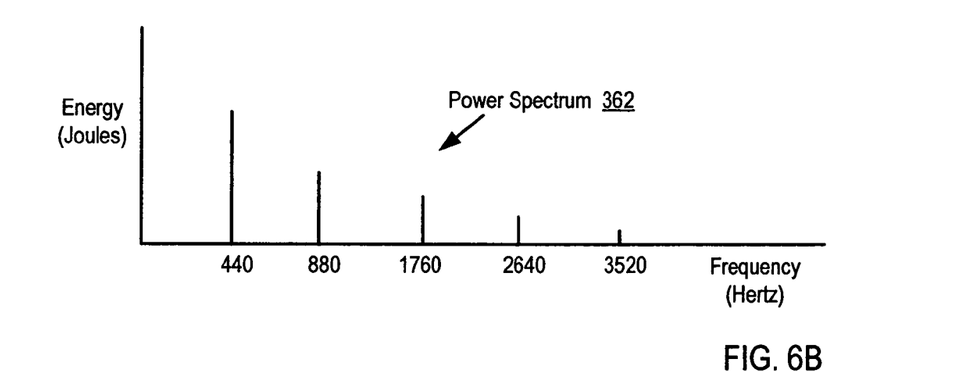
FIG. 6B depicts the same audio waveform after sampling of the waveform, conversion of the waveform from analog to digital form, and transformation from the time domain to the frequency domain.

FIG. 6B depicts the same audio waveform after sampling of the waveform, conversion of the waveform from analog to digital form, and transformation from the time domain to the frequency domain. FIG. 6B represents the audio waveform as the energies, measured in Joules, of its component frequencies measured in Hertz. Such a representation of waveform in terms of its component frequencies and their energies is sometimes referred to as a 'power spectrum' (362) or a 'spectral power distribution.' An audio interface module (112 on FIGS. 2 and 3) may transform a digitized form of an analog waveform the time domain to the frequency domain in a system for control of a computer user interface by sound according to embodiments of the present invention by use of a Fast Fourier Transform ('FFT'), a Z-Transform, a Discrete Cosine Transform ('DCT'), a Discrete Sine Transform ('DST'), a Discrete Hartley Transform ('DHT'), and by use of other transforms as will occur to those of skill in the art, the use of any of which is well within the scope of the present invention.

As illustrated, FIG. 6B depicts an audio signal having a fundamental frequency of 440 Hertz, A above middle-D, with a composite of several harmonics or overtones that characterize the sound from which the audio signal was derived. The frequencies and energies of the overtones give the original sound its character, whether it sounds like a whistle, voice, a clarinet, or a trumpet. Because the fundamental tone, the first harmonic, typically has the largest energy, embodiments of the present invention typically focus there.

Figure 6C:
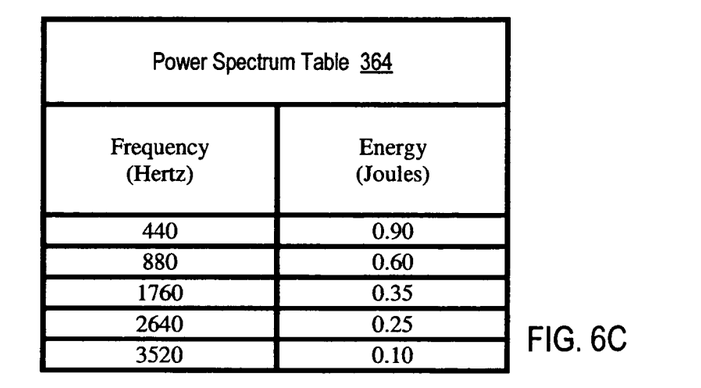
FIG. 6C represents the audio waveform as values in a data structure.

FIG. 6C depicts the same audio waveform after sampling, analog-to-digital conversion, and transformation from the time domain to the frequency domain. FIG. 6C, however, rather than representing the waveform in graph form, represents the audio waveform as values in a data structure, in this example a power spectrum table (364) having one column for the energies, measured in Joules, of the component frequencies, with the component frequencies shown in another column and measured in Hertz.

Further with reference to FIG. 4: The method of FIG. 4 also includes identifying (318) the user interface command (324) to be executed in dependence upon the spectrum (316) of frequencies and energies, the defined ranges of audio frequencies (304), and the user interface commands associated with the ranges (312). In the method of FIG. 4, identifying (318) the command (324) further includes identifying (320) the frequency (330) having the highest energy in the received spectrum and identifying (322) one of the defined ranges (304) of audio frequencies that contains the frequency having the highest energy in the received spectrum.

Identifying (320) the frequency (330) having the highest energy in the received spectrum may be carried out by finding the records of a power spectrum table whose records represent energies and frequencies of a power spectrum for a waveform representing the sound received from a user, that is, a table such as the one illustrated at reference (364) in FIG. 6C, a record having the highest energy value in its energy column. Identifying (320) the frequency (330) having the highest energy in the received spectrum then is carried out by reading the frequency from the frequency column of that same record of the power spectrum table.

In the method of FIG. 4, identifying (318) the command (324) further includes identifying (322) one of the defined ranges (304) of audio frequencies that contains the frequency having the highest energy in the received spectrum. Identifying (322) a defined range (328) of audio frequencies that contains the frequency having the highest energy in the received spectrum may be carried out by in a table that associates ranges of audio frequencies and user interface commands, such as table (312) of FIG. 4, a record defining a range of frequencies that include the frequency having the highest energy in the received spectrum. Identifying (318) the command (324) is then carried out (323) by reading the value in the command identifier (307) column of the record so found.

The method of FIG. 4 further includes executing (326) the identified command (324). Executing (326) identified user interface commands (324) in the example of FIG. 4 includes executing user interface commands that do not involve pointer movement (405) and executing commands that do move a pointer (406) in dependence upon the frequencies and energies in the received spectrum. Executing user interface commands that do not involve pointer movement (405) may be carried out through an audio interface module (112 on FIG. 3), for example, by sending to an I/O driver a driver signal representing the command, where the driver in turn registers an I/O event with event listeners representing applications or other software modules that effect the command in various ways—as described above with reference to FIG. 3. Executing commands that move a user interface pointer in dependence upon the frequencies and energies in a received spectrum of sound representing a command (406) is explained further below with reference to FIG. 7.

Figure 7:
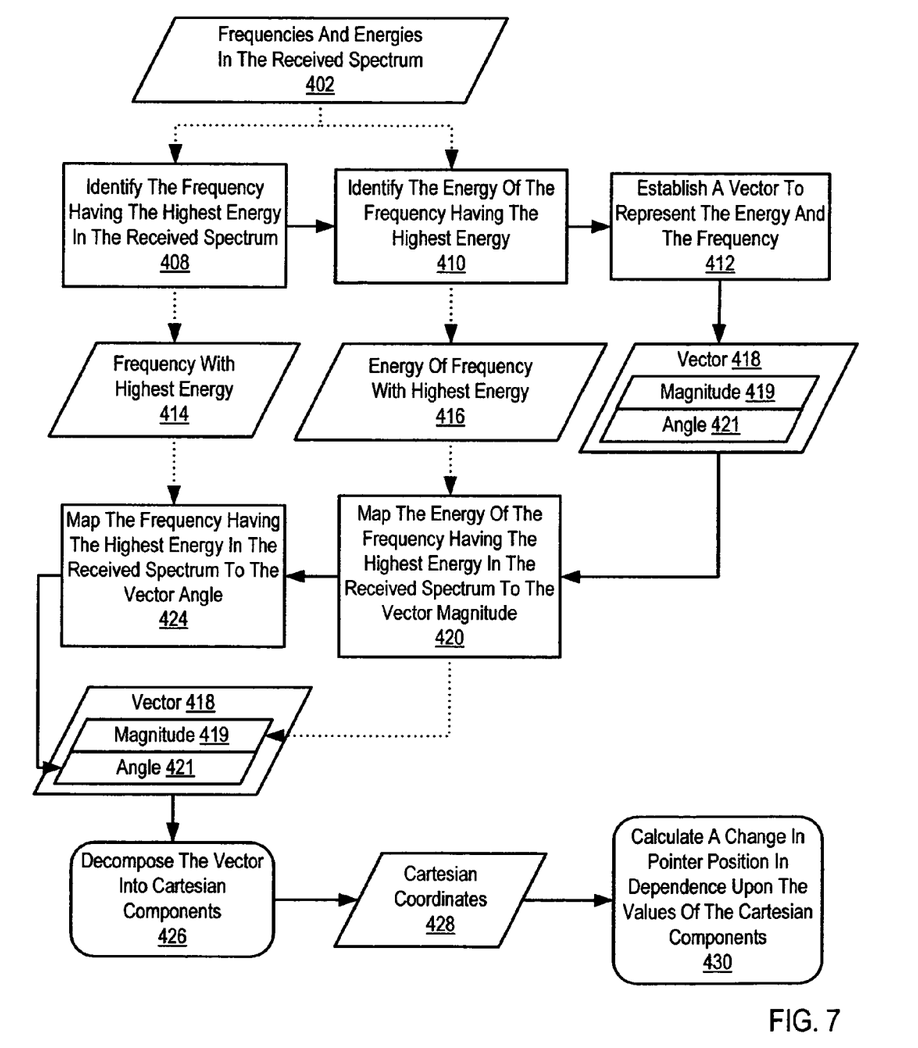
FIG. 7 sets forth a flow chart illustrating an exemplary method for executing a user interface command to move a user interface pointer.

For further explanation, FIG. 7 sets forth a flow chart illustrating an exemplary method for executing a user interface command to move a user interface pointer such as, for example, a mouse pointer. In the method of FIG. 7, as described in more detail below, executing a user interface command to move a user interface pointer is carried out by moving the user interface pointer in dependence upon the frequencies and energies in the received spectrum. The method of FIG. 7 includes identifying (408) the frequency (414) having the highest energy in a received spectrum of frequencies and energies of a sound representing a user interface command, which in this example is a command to move a user interface pointer and identifying (410) the energy (416) of the frequency having the highest energy in the received spectrum. Identifying (408) the frequency (414) having the highest energy in a received spectrum and identifying (410) the energy (416) of the frequency having the highest energy in the received spectrum are carried out as described above with reference to FIGS. 4, 5, and 6.

The method of FIG. 7 also includes establishing (412) a vector (418) to represent the motion, the speed and direction, of a user interface pointer. In the example of FIG. 7, vector (418) is characterized by a vector angle (421) representing the direction of the motion of a user interface pointer and a vector magnitude (419) representing speed of motion of a user interface pointer. The vector characterized with a magnitude and an angle is a vector specified for polar coordinates. Such a vector may also be specified for rectangular or Cartesian coordinates. A further explanation of the characterization of such a vector is provided with reference to FIG. 8.

Figure 8:
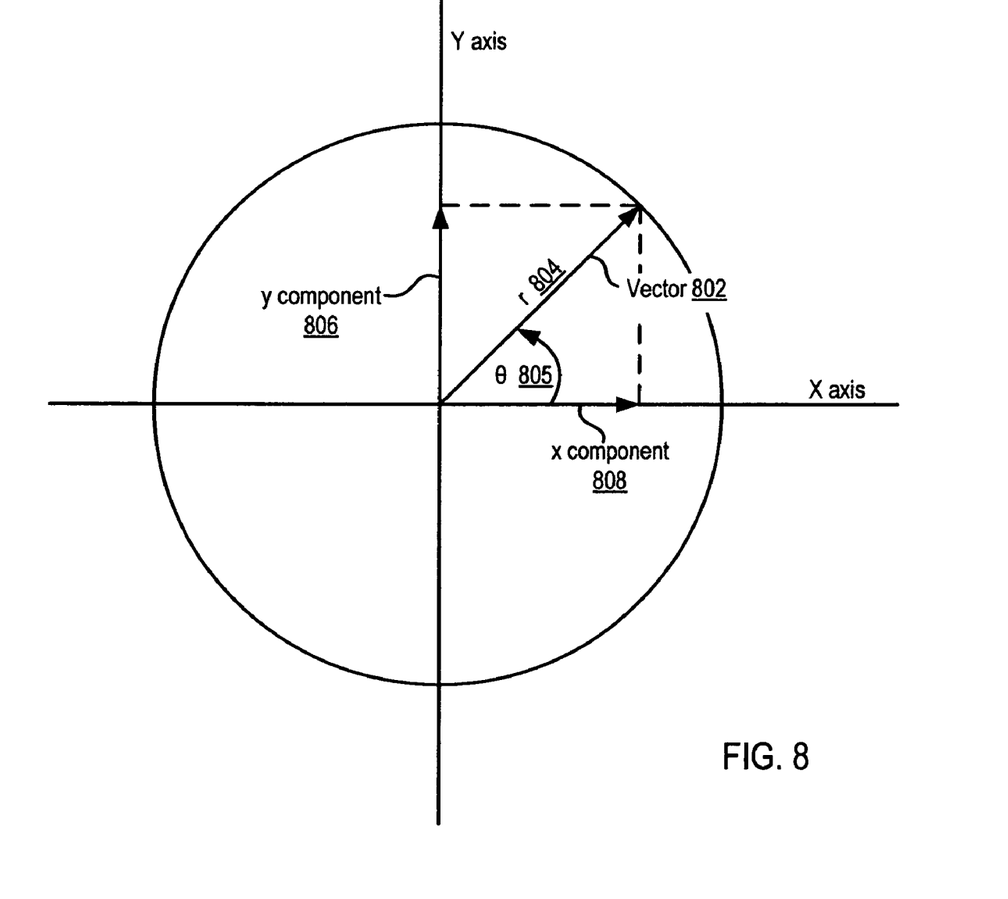
FIG. 8 sets forth a line drawing of an exemplary vector useful to represent user interface pointer motion in a system that control a computer user interface with sound according to embodiments of the present invention.

For further explanation, FIG. 8 sets forth a line drawing of an exemplary vector (802) useful to represent user interface pointer motion in a system that control a computer user interface with sound according to embodiments of the present invention. Vector (802) is represented in FIG. 8 as a magnitude r (804) oriented at a polar coordinate angle θ (805). Vector (802) is also represented as rectangular or Cartesian x-y components (806, 808). Given a polar vector magnitude r and angle θ, a representation of a vector may be converted or 'decomposed' from a polar representation into Cartesian components x,y according to: x=r cos θ, y=r sin θ.

Further with reference to FIG. 7: The method of FIG. 7 includes mapping (420) the energy (416) of the frequency having the highest energy in the received spectrum to the vector magnitude (419) of vector (418). In the method of FIG. 7, mapping (420) the energy of the frequency having the highest energy in the received spectrum to a vector magnitude alternatively may include mapping the energy to a fixed configuration parameter. That is, a system that controls a computer user interface with sound may be configured with a system parameter stored for example in non-volatile memory. The system parameter may be a constant value that represents a predefined speed of motion of a user interface pointer on a display screen of the system. Such a parameter may have, for example, a value representing a constant speed equal ⅒ the width of the display screen per second. In this way, the speed of motion of a user interface pointer in such a system would be the same regardless of the energy level of the frequency having the highest energy in the received spectrum. So long as a sound is received with a frequency with highest energy level in the range associated with the command to move the pointer, the pointer would move at the same speed regardless of the loudness of the sound.

In the method of FIG. 7, mapping (420) the energy (416) of the frequency having the highest energy to the vector magnitude further may be carried out by mapping the energy (416) as a variable according to a mapping function. In this way, the speed of a user interface pointer represented by the vector magnitude may be varied by varying the energy in the frequency having highest frequency in the spectrum, that is, by varying the loudness of the sound received to control a computer user interface.

Figure 9A:
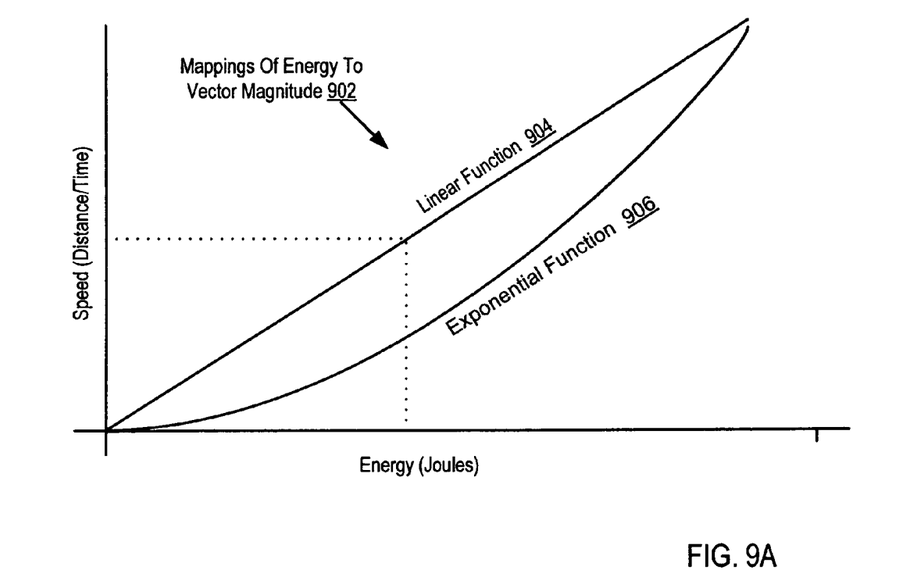
FIG. 9A sets forth a graph illustrating two mappings of energy of a frequency having the highest energy in a received spectrum to vector magnitude.

FIG. 9A sets forth a graph illustrating two mappings (902) of energy of a frequency having the highest energy in a received spectrum to vector magnitude. In the graph of FIG. 9A, the speed of user interface pointer expressed in some measure of distance over time is plotted against energy expressed in Joules. The measure of distance over time may be, for example, pixels per second, inches per second, centimeters per second, or any measure of distance over time for user interface pointer speed as will occur to those of skill in the art. The energy so plotted is the energy of the frequency having the highest energy of a received spectrum of sound representing a user interface command to move a user interface pointer. The mappings of FIG. 9A include a mapping by a linear function (904) and a mapping by an exponential function (906).

Mapping by a linear function provides a mapping of energy to speed in which speed varies linearly with energy or loudness of a sound received to control the speed of a user interface pointer. When the loudness of the sound varies by a certain change in loudness, the speed changes by a certain amount, regardless of the absolute levels of energy or loudness.

Mapping by a non-linear, exponential function provides a mapping of energy to speed in which speed varies non-linearly with energy or loudness of a sound received to control the speed of a user interface pointer. When the loudness of the sound varies by a certain change in loudness at low levels of energy or loudness, the speed changes by a certain relatively small amount. When the loudness of the sound varies by a certain change in loudness at higher levels of energy or loudness, the speed changes by a certain relatively larger amount. And so on. Thereby providing a finer granularity of control that is useful in at least some applications.

FIG. 9A presents two ways of mapping energy of a frequency having the highest energy in a received spectrum to vector magnitude, for explanation, not for limitation of the present invention. In fact, other ways of mapping energy of a frequency having the highest energy in a received spectrum to vector magnitude will occur to those of skill in the art, and all such ways are well within the scope of the present application.

Figure 9B:
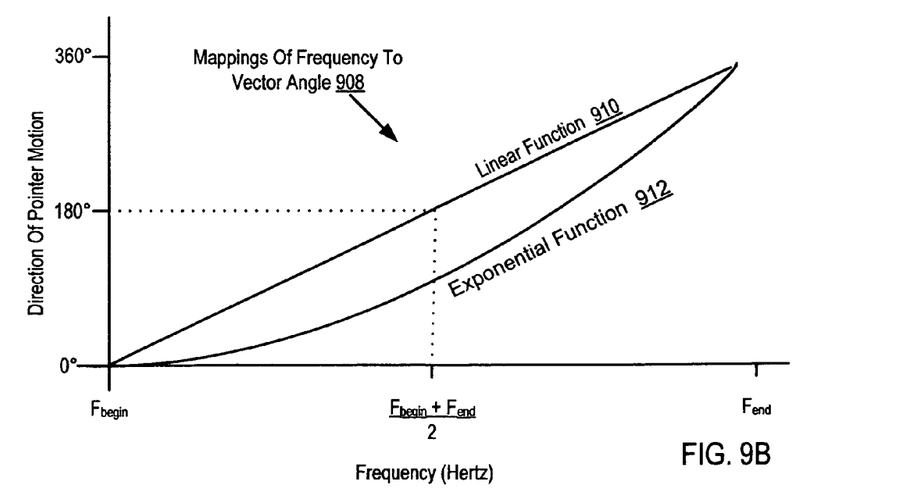
FIG. 9B sets forth a graph illustrating two mappings of a frequency having the highest energy in a received spectrum to vector magnitude.

Further with reference to FIG. 7: The method of FIG. 7 includes mapping (424) to the vector angle (421) of vector (418) the frequency (414) having the highest energy in the received spectrum. In the method of FIG. 7, mapping (424) to the vector angle (421) of vector (418) the frequency (414) having the highest energy in the received spectrum may be carried out by mapping the frequency (414) as a variable according to a mapping function. In this way, the direction of motion of a user interface pointer represented by the vector angle may be varied by varying the frequency having highest frequency in the spectrum, that is, by varying the overall pitch of the sound received to control a computer user interface. FIG. 9B sets forth a graph illustrating two mappings (908) of a frequency having the highest energy in a received spectrum to vector magnitude. In the graph of FIG. 9B, the direction of motion of a user interface pointer expressed degrees is plotted against frequency expressed in Hertz. The frequency so plotted is the frequency having the highest energy of a received spectrum of sound representing a user interface command to move a user interface pointer.

The mappings of FIG. 9B include a mapping by a linear function (910) and a mapping by an exponential function (912). Mapping by a linear function provides a mapping of frequency to direction in which direction varies linearly with frequency or pitch of a sound received to control the direction of a user interface pointer. When the frequency of the sound varies by a certain change in frequency, the direction of motion of the pointer changes by a certain amount, regardless of the specific frequency or frequencies involved.

Mapping by a non-linear, exponential function provides a mapping of frequency to direction in which direction varies non-linearly with frequency or pitch of a sound received to control the direction of motion of a user interface pointer. When the pitch of the sound varies by a certain change in pitch at a low point in the range of frequencies associated with the command to move the pointer, the direction changes by a certain relatively small amount. When the pitch of the sound varies by a certain change in pitch at a higher point in the range of frequencies associated with the command to move the pointer, the direction changes by a certain relatively larger amount. And so on. Thereby providing a finer granularity of control that is useful in at least some applications.

FIG. 9B presents two ways of mapping a frequency having the highest energy in a received spectrum to vector angle, for explanation, not for limitation of the present invention. In fact, other ways of mapping a frequency having the highest energy in a received spectrum to vector angle will occur to those of skill in the art, and all such ways are well within the scope of the present application.

Further with reference to FIG. 7: One alternative conclusion of the method of FIG. 7 is to provide vector (418), with its magnitude representing speed and its angle representing direction, to a driver such as mouse driver (155) of FIG. 3. Not all drivers affecting user interface pointer motion will accept driver signal representing speed and direction. Many such drivers accept only driver signals representing a series of pointer positions, a sequence of x-y coordinates. The method of FIG. 7 therefore includes the optional additional step of decomposing (426) the vector (418) into Cartesian components (428) that represent the speed of pointer motion on an x-axis and the speed of pointer motion on a y-axis. Decomposing (426) the vector (418) into Cartesian components (428) may be carried out as described above with reference to FIG. 8. That is, given a vector magnitude r and angle θ, the vector may be decomposed from its polar representation into Cartesian components x and y according to: x=r cos θ, y=r sin θ.

The Cartesian components so calculated are actually components of a velocity vector. Each of the components represents a speed along an axis. For a driver that accepts only driver signals represented as a series of pointer positions, a sequence of x-y coordinates needs to be provided to simulate the speed and direction of movement of a pointer. The method of FIG. 7 therefore provides also the additional optional step of calculating (430) a change in pointer position in dependence upon the values of the Cartesian components (428), that is, the Cartesian components of a vector of velocity. Calculating (430) a change in pointer position in dependence upon the values of Cartesian components x and y (428) may be carried out by multiplying the x and y values by some interval of time Δt between members of a sequence of x-y coordinates, that is, according to:

$$x_n = s_x \Delta t + x_{n-1}',$$

$$y_n = s_y \Delta t + y_{n-1}$$

where: $x_n$ is an x coordinate to be provided to a driver at the end of the current time interval Δt, $s_x$ is the speed component of the velocity vector along the x axis, $x_{n-1}$ is the x coordinate that was provided to the driver at the end of the previous time interval Δt, $y_n$ is a y coordinate to be provided to the driver at the end of the current time interval Δt, $s_x$ is the speed component of the velocity vector along the y axis, and $y_{n-1}$ is the y coordinate that was provided to the driver at the end of the previous time interval Δt.

In view of the explanation set forth above, readers will recognize that GUI motion control according to embodiments of the present invention may include, in addition to pointer motion, scrolling effected through scroll bars, mouse roller wheels, GUI buttons, and with other controls as will occur to those of skill in the art. Such scrolling control may be implemented, for example, after a vector is produced to represent scroll motion in a manner similar to the production of a vector to represent pointer motion as described above, the magnitude of the vector is taken to be the speed of scrolling movement, and because scrolling can be horizontal, vertical, or z-dimensional (as for example, a zoom), a number of subranges of audio frequencies may be used to specify up, down, right, left, zoom in, zoom out, and so on. The same methods according to embodiments of the present invention, representing direction of motion with a vector angle and speed of motion with a vector magnitude may be used to implement any display motion of a GUI.

Exemplary embodiments of the present invention are described largely in the context of a fully functional computer system for controlling a computer user interface with sound. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for controlling a computer user interface with sound, the method comprising:
    defining ranges of audio frequencies;
    associating each range with a respective user interface command;
    receiving as input from a user a sound characterized by a spectrum of frequencies and energies;
    identifying the sound as a command to move a user interface pointer, based at least partially upon the spectrum of frequencies and energies, the defined ranges of audio frequencies, and the user interface commands associated with the defined ranges; and
    executing the command to move the user interface pointer, wherein executing the command to move the user interface pointer comprises:
        identifying a frequency value of a frequency of the spectrum of frequencies and energies having a greatest energy;
        identifying an energy value of the frequency of the spectrum of frequencies and energies having the greatest energy;
        determining, using a one-to-one correlation between the energy value and speed of motion of the user interface pointer, a value representative of a speed of motion of the user interface pointer;
        determining, using a one-to-one correlation between the frequency value and angle of motion of the user interface pointer, a value representative of an angle of motion of the user interface pointer, from at least three possible angles of motion of the user interface pointer; and moving the user interface pointer in dependence upon the determined value representative of a speed of motion of the user interface pointer and the determined value representative of an angle of motion of the user interface pointer.

2. The method of claim 1 wherein the user interface commands associated with the defined ranges of audio frequencies include mouse clicks and commands to move a user interface pointer.

3. The method of claim 1 wherein identifying the sound as a command to move a user interface pointer comprises:
    identifying the frequency value of the frequency of the spectrum of frequencies and energies having the greatest energy; and
    identifying one of the defined ranges of audio frequencies that contains the frequency value.

4. The method of claim 1, wherein determining a value representative of a speed of motion of the user interface pointer comprises mapping the energy value of the frequency of the spectrum of frequencies and energies having the greatest energy to a vector magnitude representing the speed of motion of the user interface pointer and wherein determining a value representative of an angle of motion of the user interface pointer comprises mapping the frequency value of the frequency of the spectrum of frequencies and energies having the greatest energy to a vector angle representative of the angle of motion of the user interface pointer, and wherein executing the command to move the user interface pointer further comprises:
    decomposing a vector formed by the vector magnitude and the vector angle into Cartesian components that represent speed of pointer motion on an x-axis and speed of pointer motion on a y-axis; and
    calculating a change in pointer position in dependence upon the values of the Cartesian components.

5. The method of claim 4 wherein mapping the energy value of the frequency of the spectrum of frequencies and energies having the greatest energy to a vector magnitude further comprises mapping the energy value as a variable according to a mapping function.

6. The method of claim 4 wherein mapping the energy value of the frequency of the spectrum of frequencies and energies having the greatest energy to the vector magnitude further comprises mapping the energy value to a fixed configuration parameter.

7. The method of claim 4, wherein mapping the frequency value of the frequency of the spectrum of frequencies and energies having the greatest energy to a vector angle representative of the angle of motion of the user interface pointer comprises mapping the frequency value as a variable according to a continuous mapping function.

8. The method of claim 1, wherein determining a value representative of an angle of motion of the user interface pointer, from at least three possible angles of motion of the user interface pointer, comprises determining a value representative of an angle of motion of the user interface pointer from a continuum of potential angles of motion.

9. A system for controlling a computer user interface with sound, the system comprising at least one computer processor and a computer memory operatively coupled to the at least one computer processor, the computer memory having disposed within it computer program instructions which, when executed, cause performance of a method comprising:
    defining ranges of audio frequencies;
    associating each range with a respective user interface command;
    receiving as input from a user a sound characterized by a spectrum of frequencies and energies;
    identifying the sound as a command to move a user interface pointer, based at least partially upon the spectrum of frequencies and energies, the defined ranges of audio frequencies, and the user interface commands associated with the defined ranges; and
    executing the command to move the user interface pointer, wherein executing the command to move the user interface pointer comprises:

identifying a frequency value of a frequency of the spectrum of frequencies and energies having a greatest energy;

identifying an energy value of the frequency of the spectrum of frequencies and energies having the greatest energy;

determining, using a one-to-one correlation between the energy value and speed of motion of the user interface pointer, a value representative of a speed of motion of the user interface pointer;

determining, using a one-to-one correlation between the frequency value and angle of motion of the user interface pointer, a value representative of an angle of motion of the user interface pointer, from at least three possible angles of motion of the user interface pointer; and moving the user interface pointer in dependence upon the determined value representative of a speed of motion of the user interface pointer and the determined value representative of an angle of motion of the user interface pointer.

10. The system of claim 9 wherein the user interface commands associated with the defined ranges of audio frequencies include mouse clicks and commands to move a user interface pointer.

11. The system of claim 9 wherein identifying the sound as a command to move a user interface pointer comprises:

identifying the frequency value of the frequency of the spectrum of frequencies and energies having the greatest energy; and identifying one of the defined ranges of audio frequencies that contains the frequency value.

12. The system of claim 9, wherein determining a value representative of a speed of motion of the user interface pointer comprises mapping the energy value of the frequency of the spectrum of frequencies and energies having the greatest energy to a vector magnitude representing the speed of motion of the user interface pointer and wherein determining a value representative of an angle of motion of the user interface pointer comprises mapping the frequency value of the frequency of the spectrum of frequencies and energies having the greatest energy to a vector angle representative of the angle of motion of the user interface pointer, and wherein executing the command to move the user interface pointer further comprises:

decomposing a vector formed by the vector magnitude and the vector angle into Cartesian components that represent speed of pointer motion on an x-axis and speed of pointer motion on a y-axis; and calculating a change in pointer position in dependence upon the values of the Cartesian components.

13. The system of claim 12 wherein mapping the energy value of the frequency of the spectrum of frequencies and energies having the greatest energy to a vector magnitude further comprises mapping the energy value as a variable according to a mapping function.

14. The system of claim 12 wherein mapping the energy value of the frequency of the spectrum of frequencies and energies having the greatest energy to the vector magnitude further comprises mapping the energy value to a fixed configuration parameter.

15. The system of claim 12, wherein mapping the frequency value of the frequency of the spectrum of frequencies and energies having the greatest energy to a vector angle representative of the angle of motion of the user interface pointer comprises mapping the frequency value as a variable according to a continuous mapping function.

16. The system of claim 9, wherein determining a value representative of an angle of motion of the user interface pointer, from at least three possible angles of motion of the user interface pointer, comprises determining a value representative of an angle of motion of the user interface pointer from a continuum of potential angles of motion.

17. A computer program product for controlling a computer user interface with sound, the computer program product disposed upon a recordable computer readable medium, the computer program product comprising computer program instructions which, when executed, cause performance of a method comprising:

defining ranges of audio frequencies;

associating each range with a respective user interface command;

receiving as input from a user a sound characterized by a spectrum of frequencies and energies;

identifying the sound as a command to move a user interface pointer, based at least partially upon the spectrum of frequencies and energies, the defined ranges of audio frequencies, and the user interface commands associated with the defined ranges; and executing the command to move the user interface pointer, wherein executing the command to move the user interface pointer comprises:

identifying a frequency value of a frequency of the spectrum of frequencies and energies having a greatest energy;

identifying an energy value of the frequency of the spectrum of frequencies and energies having the greatest energy;

determining, using a one-to-one correlation between the energy value and speed of motion of the user interface pointer, a value representative of a speed of motion of the user interface pointer;

determining, using a one-to-one correlation between the frequency value and angle of motion of the user interface pointer, a value representative of an angle of motion of the user interface pointer, from at least three possible angles of motion of the user interface pointer; and moving the user interface pointer in dependence upon the determined value representative of a speed of motion of the user interface pointer and the determined value representative of an angle of motion of the user interface pointer.

18. The computer program product of claim 17 wherein the user interface commands associated with the defined ranges of audio frequencies include mouse clicks and commands to move a user interface pointer.

19. The computer program product of claim 17 wherein identifying the sound as a command to move a user interface pointer comprises:

identifying the frequency value of the frequency of the spectrum of frequencies and energies having the greatest energy; and identifying one of the defined ranges of audio frequencies that contains the frequency value.

20. The computer program product of claim 17, wherein determining a value representative of a speed of motion of the user interface pointer comprises mapping the energy value of the frequency of the spectrum of frequencies and energies having the greatest energy to a vector magnitude representing the speed of motion of the user interface pointer and wherein determining a value representative of an angle of motion of the user interface pointer comprises mapping the frequency value of the frequency of the spectrum of frequencies and energies having the greatest energy to a vector angle representative of the angle of motion of the user interface pointer, and wherein executing the command to move the user interface pointer further comprises:

decomposing a vector formed by the vector magnitude and the vector angle into Cartesian components that represent speed of pointer motion on an x-axis and speed of pointer motion on a y-axis; and     calculating a change in pointer position in dependence upon the values of the Cartesian components.

21. The computer program product of claim 20 wherein mapping the energy value of the frequency of the spectrum of frequencies and energies having the greatest energy to a vector magnitude further comprises mapping the energy value as a variable according to a mapping function.

22. The computer program product of claim 20 wherein mapping the energy value of the frequency of the spectrum of frequencies and energies having the greatest energy to the vector magnitude further comprises mapping the energy value to a fixed configuration parameter.

23. The computer program product of claim 20, wherein mapping the frequency value of the frequency of the spectrum of frequencies and energies having the greatest energy to a vector angle representative of the angle of motion of the user interface pointer comprises mapping the frequency value as a variable according to a continuous mapping function.

24. The computer program product of claim 17, wherein determining a value representative of an angle of motion of the user interface pointer, from at least three possible angles of motion of the user interface pointer, comprises determining a value representative of an angle of motion of the user interface pointer from a continuum of potential angles of motion.

25. A method for use in a computer system, the method comprising:

receiving as input from a user a sound characterized by a spectrum of frequencies and energies;

identifying the sound as a command to move a user interface pointer; and     executing the command to move the user interface pointer, wherein executing the command comprises processing the sound using at least one processor, the processing comprising:

identifying a frequency value of a frequency of the spectrum of frequencies and energies having a greatest energy;

identifying an energy value of the frequency of the spectrum of frequencies and energies having the greatest energy;

determining, using a one-to-one correlation between the energy value and speed of motion of the user interface pointer of the computer system, a value representative of a speed of motion of the user interface pointer;

determining, using a one-to-one correlation between the frequency value and angle of motion of the user interface pointer, a value representative of an angle of motion of the user interface pointer; and         moving the user interface pointer in dependence upon the determined value representative of a speed of motion of the user interface pointer and the determined value representative of an angle of motion of the user interface pointer.

26. A system for controlling a computer user interface with sound, the system comprising at least one computer processor and a computer memory operatively coupled to the at least one computer processor, the computer memory having disposed within it computer program instructions which, when executed, cause performance of a method comprising:

receiving as input from a user a sound characterized by a spectrum of frequencies and energies;

identifying the sound as a command to move a user interface pointer; and     executing the command to move the user interface pointer, wherein executing the command comprises processing the sound using the at least one computer processor, the processing comprising:

identifying a frequency value of a frequency of the spectrum of frequencies and energies having a greatest energy;

identifying an energy value of the frequency of the spectrum of frequencies and energies having the greatest energy;

determining, using a one-to-one correlation between the energy value and speed of motion of the user interface pointer, a value representative of a speed of motion of the user interface pointer;

determining, using a one-to-one correlation between the frequency value and angle of motion of the user interface pointer, a value representative of an angle of motion of the user interface pointer; and         moving the user interface pointer in dependence upon the determined value representative of a speed of motion of the user interface pointer and the determined value representative of an angle of motion of the user interface pointer.

27. A recordable computer readable medium comprising computer program instructions which, when executed, cause performance of a method comprising:

receiving as input from a user a sound characterized by a spectrum of frequencies and energies;

identifying the sound as a command to move a user interface pointer; and     executing the command to move the user interface pointer, wherein executing the command comprises processing the sound, the processing comprising:

identifying a frequency value of a frequency of the spectrum of frequencies and energies having a greatest energy;

identifying an energy value of the frequency of the spectrum of frequencies and energies having the greatest energy;

determining, using a one-to-one correlation between the energy value and speed of motion of the user interface pointer, a value representative of a speed of motion of the user interface pointer;

determining, using a one-to-one correlation between the frequency value and angle of motion of the user interface pointer, a value representative of an angle of motion of the user interface pointer; and         moving the user interface pointer in dependence upon the determined value representative of a speed of motion of the user interface pointer and the determined value representative of an angle of motion of the user interface pointer.

* * * * *